May 15, 1951  R. G. LE TOURNEAU  2,553,376
CONSTANT MESH TRANSMISSION

Filed March 18, 1947  2 Sheets-Sheet 1

INVENTOR
R. G. LeTourneau
BY
ATTORNEYS

May 15, 1951     R. G. LE TOURNEAU     2,553,376
CONSTANT MESH TRANSMISSION

Filed March 18, 1947     2 Sheets—Sheet 2

INVENTOR
R.G. LeTourneau
ATTORNEYS

Patented May 15, 1951

2,553,376

UNITED STATES PATENT OFFICE 2,553,376

CONSTANT MESH TRANSMISSION

Robert G. Le Tourneau, Longview, Tex., assignor to R. G. Le Tourneau, Inc., Stockton, Calif., a corporation Application March 18, 1947, Serial No. 735,484

3 Claims. (Cl. 74—360)

This invention provides a novel constant mesh transmission adaptable for use in industrial, construction, and earth working implements, as for example tractors, or the Bulldozing Machine shown in pending application for U. S. patent, Serial No. 727,804, filed February 11, 1947.

Another object of the invention is to provide a transmission, of constant mesh type, which includes multiple speeds forward and reverse; there being a novel assembly of fluid pressure actuated clutches arranged to effect reversing of the direction of drive, and speed changes in each such direction of drive, selectively and without the necessity, as is generally required, of stopping operation of the implement in which the transmission is embodied. This latter feature is important, as speed changes can be accomplished, in a tractor or bulldozing machine for example, without the loss of traction which would be attendant a stop for shifting the transmission. In this connection it will be seen that with the gears always in mesh, and with the type of clutches employed, there is no damage caused if the transmission control is inadvertently thrown into reverse while the machine is in forward motion; the clutches in this instance act as a brake until the driven shaft has stopped, and then resume their normal function of transmitting the driving power from the engine.

A further object of the invention is to provide a transmission, as above, which includes a housing; such transmission having its constant mesh gear trains within the housing for proper lubrication, but arranged with the clutches exteriorly of the housing for effective cooling and ease of access for maintenance, repair, or replacement.

An additonal object of the invention is to provide a transmission of the type described, including fluid pressure actuated clutches of novel construction.

It is also an object of the invention to provide a constant mesh transmission, including relatively fast acting, fluid pressure actuated clutches, whereby shifting from one stage to another of said transmission, for either higher or lower output speed, can be accomplished without any material time lag, or torque loss, with the result that the implement embodying the transmission experiences no unnecessary loss of speed or traction. In other words, the transmission is capable of delivering a substantially constant torque, regardless of the shifting from stage to stage thereof.

A further object of the invention is to provide a practical constant mesh transmission, and one which will be exceedingly effective for the purpose for which it is designed.

These objects are accomplished by means of such structure and relative arrangement of parts as will fully appear by a perusal of the following specification and claims.

Figure 1:
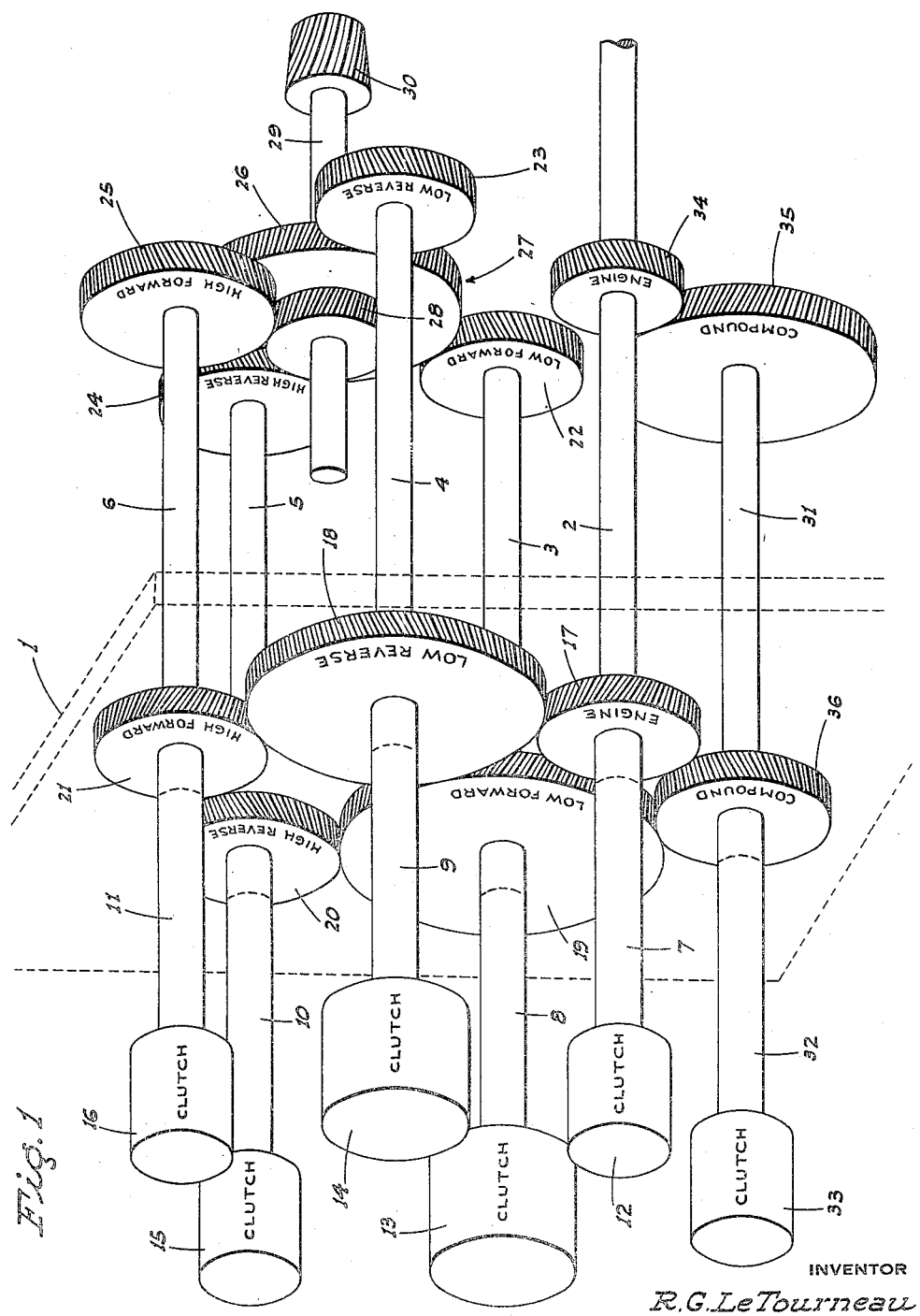
Fig. 1 is a diagrammatic perspective view illustrating the constant mesh gear trains and corresponding fluid pressure actuated clutches.

Referring now more particularly to the characters of reference on the drawings, and particularly at present to Fig. 1, the improved constant mesh transmission is mounted in connection with a transmission housing (not shown in full) which includes an end wall 1. A plurality of parallel shafts, indicated at 2, 3, 4, 5, and 6, are journaled in the transmission housing in predetermined spaced parallel relationship, and said shafts all project through the end wall 1 to a termination therebeyond; the projecting portions of said shafts each being surrounded by a corresponding tubular shaft 7, 8, 9, 10, and 11, respectively.

Corresponding ones of the projecting portions of shafts 2—6 inclusive, and the surrounding tubular shafts 7—11 inclusive, are coupled together at their outer ends by normally released or disengaged clutches, indicated generally at 12, 13, 14, 15, and 16, respectively. These clutches are fluid pressure actuated under the selective control of the implement operator.

The clutches 12—16, inclusive, are each of substantially identical construction, varying only in capacity or size; a representative one of these clutches being hereinafter described in detail.

The tubular shafts 7—11, inclusive, at the ends opposite corresponding clutches, project into the transmission housing through the end wall 1, and within said housing carry certain of the transmission gears, as hereinafter described.

The shaft 2 is the drive shaft of the transmission, and is adapted to be connected to the engine at the end of said shaft opposite the clutch 12.

Within the transmission housing the tubular shaft 7 is fitted with a drive or "engine" gear 17, which runs in mesh with a "low-reverse" gear 18 mounted on the inner end of the tubular shaft 9.

A "low-forward" gear 19, carried on the inner end of the tubular shaft 8, runs in mesh with the low-reverse gear 18, and in turn the low-forward gear 19 drives a "high-reverse" gear 20, on the inner end of the tubular shaft 10. A "high-forward" gear 21, on the inner end of the tubular shaft 11 is driven by the low-reverse gear 18.

The above may be termed the drive gear train of the transmission, and serves to actuate a driven gear train comprising, in spaced relation, i. e. adjacent the ends of the shafts 2-6, inclusive, opposite the clutches, the following:

The shafts 3, 4, 5, and 6 are fitted with "low-forward," "low-reverse," "high-reverse," and "high-forward" gears, indicated at 22, 23, 24, and 25, respectively.

The low forward gear 22 and low reverse gear 23 of the driven gear train both run in mesh with a relatively large-diameter gear 26 of an output gear unit, indicated generally at 27; such output gear unit including a relatively smaller gear 28. The high-reverse gear 24 and the high-forward gear 25 both run in mesh with the gear 28.

The output gear unit 27 is carried on an output shaft 29 carrying an output pinion 30. This pinion 30 transmits the drive to the mechanism driven by the transmission.

Speed changes, two normal speeds forward and two normal speeds rearward, of the above described transmission are accomplished, without stopping the operation of said transmission, by selective control of the clutches 12-16, inclusive, as follows:

The shaft 2 is constantly driven from the engine, and upon engagement of the clutch 12, the engine gear 17, together with the entire drive gear train, comprised of gears 18-21 inclusive, is rotated.

Selective engagement, separately, of clutches 13, 14, 15, and 16, when the clutch 12 is engaged, provides low-forward, low-reverse, high-reverse, and high-forward drive, respectively, of the transmission, through the medium of the described driven gear train leading to the output shaft 29 and output pinion 30.

In other words, normal forward and reverse speeds are accomplished by engagement, at the same time, of clutch 12 and one of the clutches comprising the assembly of clutches 13-16, inclusive.

A compound drive through the transmission (two speeds forward and two speeds reverse) is accomplished as follows:

Another shaft 31 extends in the transmission housing and projects through the end wall 2 to a termination therebeyond; the projecting portion of the shaft 31 being surrounded by a tubular shaft 32 which, at its inner end, leads back through said end wall; adjacent outer ends of the shafts 31 and 32 being coupled by a normally disengaged, fluid pressure actuated clutch 33 under the control of the implement operator.

Within the transmission housing the drive shaft 2 includes an "engine" gear 34 driving a "compound" gear 35. Another "compound" gear 36 on the inner end of the shaft 32 runs in mesh with the low forward gear 19; all whereby the drive gear train, upon engagement of the clutch 33, is driven, but at a lower speed ratio than is accomplished when the clutch 12 is engaged.

For compound speed changes (two forward and two reverse), the clutch 12 is permitted to remain disengaged, and the clutch 33 is engaged, together with a selected one of the clutches 13, 14, 15, and 16, to provide compound low-forward, compound low-reverse, compound high-reverse, and compound high-forward, respectively.

It will be seen that by reason of the described transmission assembly the same provides, in total, four speeds forward and four speeds reverse, all of which are readily available to the operator of the implement through the simple manipulation of controls for the respective clutches.

Figure 2:
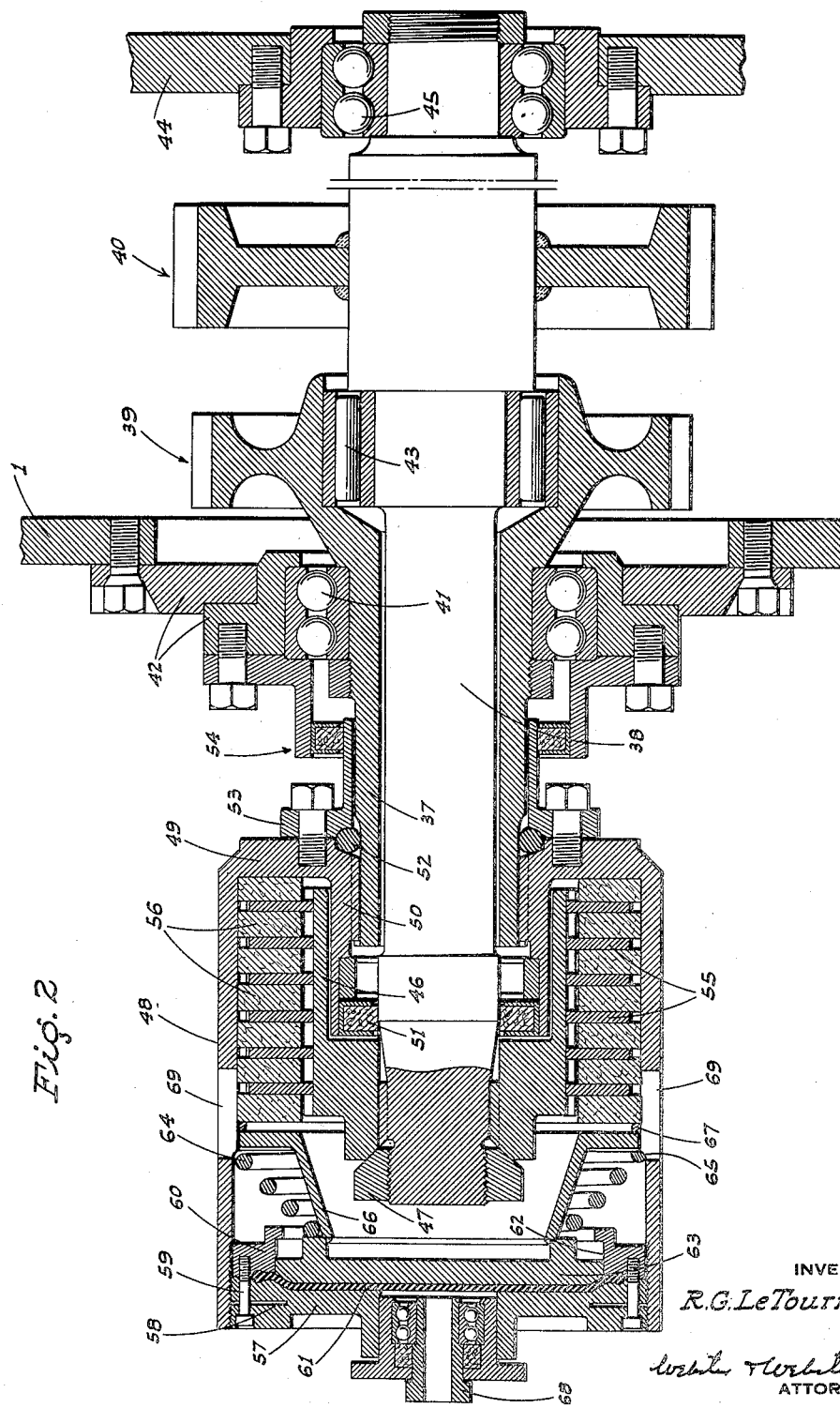
Fig. 2 is an enlarged sectional elevation of one of the fluid pressure actuated clutches, and the corresponding input and output gear and shaft assembly.

As each of the clutches are of substantially identical construction, except for size or capacity, a description of one thereof will suffice, in order to avoid unnecessary repetition. This one clutch is shown in detail in Fig. 2, to which specific reference is now made.

In this view the transmission shaft, which projects through the end wall 1, and the cooperating tubular shaft, are indicated, for reference, at 37 and 38, respectively; and are hereinafter referred to as the "input" shaft and "output" shaft, carrying, respectively, within the housing an input gear 39 of the drive gear train, and an output gear 40 of the driven gear train.

The input shaft 37 is formed integral with the input gear 39, and said shaft is carried from the housing end wall 1 by a bearing 41 supported in a mounting 42. In turn the input gear 39 is journaled on the output shaft 39 by a bearing 43. The transmission housing includes an end wall 44 opposite the wall 1, and the adjacent end of the output shaft 38 is journaled in connection with the wall 44, as at 45.

The clutch is cooperatively associated with the input and output shafts 37 and 38 outwardly of the end wall 1 and comprises the following:

The output shaft 38 projects outwardly a short distance beyond the outer end of the tubular input shaft 37, and the projecting part of said shaft 38 is fitted with a cylindrical hub 46, secured in place by a nut 47.

A cylindrical cage 48 surrounds the hub 46 in spaced, concentric relation, projecting at its ends beyond corresponding ends of said hub. At its inner end the cage 48 is closed, as at 49, and said closed end is formed with a hub 50 splined on the adjacent end portion of the input shaft 37. The hub 50 is socketed in the hub 46, as shown, with a suitable seal 51 between the hub 50 and the output shaft 38.

Axial displacement of the cylindrical cage 48 relative to the input shaft 37 is prevented by means of a locking ring 52 held in place by a retaining collar 53; there being a sealing unit, indicated generally at 54, between the retaining collar 53 and the mounting 42.

A plurality of annular clutch plates 55 and 56 surround the hub 46 in alternate relation between said hub and the cylindrical cage 48; the annular clutch plates 55 being splined to the hub 46, while the annular clutch plates 56 are splined to the cage 48.

The clutch plates 55 and 56 are axially shiftable, whereby when the assembly thereof is firmly compressed into close frictional engagement against the closed end 49 of the cage 48, the clutch is engaged.

The mechanism for engaging the clutch, which clutch is normally free or disengaged, comprises:

The cylindrical cage 48 projects axially outwardly some distance beyond the nut 47, and a circular end head 57 is threaded into said cage, and normally but releasably maintained against rotative adjustment by circumferentially splitting said head, as at 58, and locking up the threads on opposite sides of the split by screws 59. The screws 59 likewise act to secure, to the inner face of the end head 57, and adjacent its periphery, a ring 60, which peripherally attaches a disc or diaphragm 61 in place against the inner face of said head.

The ring 60 is formed with a shallow cylinder 62 having a disc-type piston 63 axially immovable therein; said piston 63 normally being urged into contact with the diaphragm 61 by a compression spring 64 which bears, at its opposite end, against an annular shoulder 65 in the cage 48.

A thrust cone 66 is fixed in connection with the piston 63 in concentric relation, and extends axially inwardly to engagement with a ring 67 which bears against the adjacent endmost one of the annular clutch plates 56.

Centrally, the end head 57 is provided with a non-rotatable fitting 68, to which a fluid pressure feed conduit (not shown) is adapted to connect; such conduit being included in a fluid pressure supply system, valve regulated by the implement operator, so that fluid, under pressure, may be introduced into the clutch at the will of said operator. At its inner end the fitting 68 delivers directly to the outer face of the diaphragm 61 to engage the above described clutch. Fluid, under pressure, is delivered through the fitting 68 to the diaphragm 61, causing inward deflection of the latter, and shifts the piston 63 axially in the same direction. When this occurs the thrust cone 66 acts on the assembly of clutch plates 55 and 56, compressing such assembly until the frictional engagement is such as to prevent relative rotation between said plates, whereby the output shaft 38 then is connected in driven relation to the tubular input shaft 37 and the cylindrical cage 48 which constantly rotates therewith. In this manner the input gear 39 imparts its drive to the output gear 40.

The cylindrical cage 48 is provided with a circumferential row of ports 69, which assure of adequate ventilation and cooling of the clutch when in operation; such cooling action being facilitated by reason of the rotation of the cylindrical cage 48, which turns with the driven input shaft 37.

As each clutch is disposed outside the transmission housing, such clutch is readily accessible for maintenance and repair; all of the internal working parts of the clutch being removable from the outer end of the cylindrical cage 48 upon unthreading of the end head 57.

The described transmission, together with clutches, each of which is constructed as described, provides a practical and efficient power transmitting mechanism for various types of heavy-duty equipment, finding especial adaptation to tractors and bulldozing machines.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A constant mesh transmission comprising a train of gears in constant mesh in a predetermined ratio which includes a low-reverse gear driving a low forward gear and a high forward gear, said low forward gear driving a high reverse gear, an engine shaft, a gear on said engine shaft disposed in constant mesh with the low reverse gear, a driven shaft, a separate clutch and gear means associated with each gear of the train and the driven shaft and operative to selectively and separately place such gear in driving relation with the driven shaft.

2. A constant mesh transmission comprising a train of gears in constant mesh in a predetermined ratio effective to impart to some of the gears forward movements at relatively varying speeds and to impart to others of said gears reverse movements at relatively varying speeds, an engine shaft, a gear on the engine shaft constantly meshing with but one of the gears of the train, a driven shaft, and clutch and gear means interposed between each of the gears of the train and the driven shaft and effective to selectively and separately connect each gear of the train in driving relation with the driven shaft.

3. A constant mesh transmission comprising a train of gears in constant mesh in a predetermined ratio, an engine shaft, a gear on the engine shaft disposed in constant mesh with but one of the gears of the train, a group of gears separate from the train and comprising a number of gears equal that of the train, each gear of the train being disposed co-axially with one gear of the group, clutch means for selectively separately placing each set of said co-axially disposed gears in and out of driving relation with each other, a driven shaft, gear means connecting each gear of the group of gears in driving relation with said driven shaft; a second gear on the engine shaft, another shaft, a compounding gear on said other shaft in mesh with the second gear on the engine shaft, another compounding gear in mesh with the gear in the train, clutch means for selectively disconnecting the first named engine gear from its connection with said engine shaft, and clutch means for selectively placing the second compounding gear in driving relation with said other shaft.

ROBERT G. LE TOURNEAU.

REFERENCES CITED

The following references are of record in the file of this patent:

UNITED STATES PATENTS

| Number | Name | Date |
|---|---|---|
| 1,151,762 | Day | Aug. 31, 1915 |
| 1,589,267 | Toomey | June 15, 1926 |
| 1,993,983 | Woodward | Mar. 12, 1935 |
| 2,100,810 | Livermore | Nov. 30, 1937 |
| 2,126,486 | Malkin | Aug. 9, 1938 |
| 2,400,830 | Kinnucon | May 21, 1946 |

FOREIGN PATENTS

| Number | Country | Date |
|---|---|---|
| 22,624 | Great Britain | Oct. 7, 1913 |
| 254,415 | Great Britain | July 8, 1926 |
| 462,365 | Great Britain | Mar. 8, 1937 |
| 476,001 | Germany | May 7, 1929 |